Aug. 17, 1937.  L. G. TERRY  2,090,380

COUPLING AND CONNECTER FOR ELECTRIC CONDUITS AND OUTLET BOXES

Filed Oct. 15, 1934

Inventor
L. G. Terry
by
Hazard and Miller
Attorneys.

Patented Aug. 17, 1937

2,090,380

UNITED STATES PATENT OFFICE 2,090,380

COUPLING AND CONNECTER FOR ELECTRIC CONDUITS AND OUTLET BOXES

Lloyd George Terry, Pasadena, Calif.

Application October 15, 1934, Serial No. 748,367

7 Claims. (Cl. 285—182.1)

My invention relates to a type of coupling or connecter for attachment to conduits, or the like, or to outlet boxes, or for connecting two conduits in which the coupling attaches to the conduit by a gripping pressure around the peripheral surface of the conduit and thus securely attaches the coupling to the conduit, and with my construction, the coupling may be attached to the electric outlet box, or the like, or the coupling may be formed integral with certain types of outlets.

My invention in its broader aspect relates to a coupling or connecter in the form of a sleeve with an internal shoulder. The conduits fit inside of the sleeve and the end of the conduit engages the shoulder, or if two conduits are used, engage opposite shoulders. The sleeve has a rigid portion forming the main annular body and an end portion which is resilient and contractible preferably by having longitudinal slits in this contracting portion. With this assembly I utilize a wedging collar which surrounds the contractible portion of the sleeve and either the sleeve or the collar may have a slight taper so that the collar may be driven or wedged tightly on the exterior of the sleeve and thus contract the sleeve due to the longitudinal slits, to grip and form a tight connection with the conduit.

A further object and feature of my invention as it relates to most constructions is in providing the contractible portion of the sleeve with a surface of gradually increasing diameter from its point of connection to the rigid part of the sleeve, thus making a slightly outwardly extending taper. This taper may, however, if desired, be adjacent the extreme end of the sleeve. With this type of sleeve the collar is preferably cylindrical on its inside surface and has a sufficiently loose fit that it may slide longitudinally on the portion of the sleeve of the least diameter, but wedges against the outwardly expanding end, and therefore, when wedged tightly against this expanding portion the slits are contracted and a tight grip is obtained between the resilient portion of the sleeve and the conduit fitted within the sleeve.

Another characteristic of my invention is in forming the sleeve with threads on the rigid portion, which threads may be screwthreaded in an outlet, an angle box, or the like, used in electrical wiring.

Another modification is to form the sleeve integral with an angle connection, or the like, in which the resilient portion of the sleeve is made tubular and has the longitudinal slots therein.

The slots or kerfs allow contraction of this sleeve sufficiently to press or fit the collar thereover before inserting the conduit in the sleeve.

A further modification of my invention as it relates to the attachment of the coupling or connection to an outlet box is in providing the rigid portions of the sleeve with external threads on which is threaded a nut which engages inside an outlet box and by tightening the nut, the collar is wedged against the expanded end of the split sleeve.

Another object and feature of my invention is in forming a coupling for attaching two conduits end to end. This employs a sleeve with a rigid central section having two internal shoulders spaced apart by an internal rigid section. This sleeve has longitudinal splits at both end portions. The entire sleeve is preferably cylindrical on its outside surface except that adjacent one end which expands outwardly to form a wedging surface. In conjunction with this type of sleeve I employ a wedging or locking collar which is substantially the same length as the complete sleeve and is cylindrical on its inside surface except adjacent one end in which it has an inward taper. The collar is designed to have a close sliding fit on the sleeve so that it may be inserted over the non-expanded end of the sleeve and when the collar is wedged into final position the leading end of the collar engages the outward expanded portion of the sleeve and the inwardly tapered end of the collar engages the opposite end of the sleeve. Thus, the resilient end portions of the sleeve having the splits are simultaneously contracted and engage or grip the two conduits inserted in the sleeve.

My invention is illustrated in connection with the accompanying drawing, in which:

Fig. 4 is a longitudinal section showing the use of my invention in an outlet box, or the like.

Figure 1:
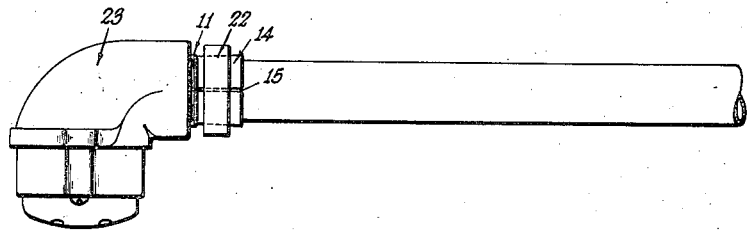
Fig. 1 is a side elevation showing a use of my invention in connection with an elbow type of electric cord outlet.
Figure 2:
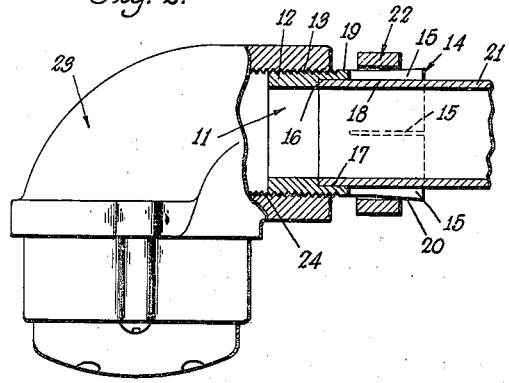
Fig. 2 is an enlarged view, the features of my invention being shown in diametrical section.

Dealing first with the construction shown in Figs. 1 and 2, the sleeve 11 is illustrated as having a rigid section 12 which is screwthreaded externally at 13. This sleeve has a resilient end structure 14 formed by having a plurality of longitudinal slits or kerfs 15. A shoulder 16 is provided in the rigid portion, this portion having an inside cylindrical surface 17. The yielding portion of the sleeve also preferably has a cylindrical inner surface 18. The major portion of the outside surface 19 of the compressible portion of the sleeve is cylindrical but provided with an outward expanding cam section 20 near the end. The conduit 21 shown as cylindrical is inserted through the contracted end of the sleeve and fits in the inside cylindrical surface thereof, the end of the conduit abutting against the shoulder 16. This shoulder therefore forms a stop limiting the insertion of the conduit. A collar 22 surrounds the sleeve and may be inserted over the rigid threaded end. This collar has a sliding fit on the major portion of the section having the slots. The inside surface of this collar is preferably cylindrical so that when forced towards the end of the sleeve having the wedge or cam surface 20, this surface which is annular, except for the slots, is contacted substantially by an inner edge of the collar which causes a compression or wedging of the outer portions of the compressible section of the sleeve and thus tightly grips the conduit. With my construction when properly executed, the conduit may be gripped with sufficient tightness so that the conduit and the sleeve and collar function as a unit allowing the conduit with the sleeve to be threaded if desired in the fitting 23 which is internally threaded at an opening indicated at 24. However, if desired, the sleeve with the collar can first be secured to the fitting then the conduit may be inserted in the sleeve and the collar 22 jammed outwardly to firmly attach the conduit to the sleeve and thus to the fitting.

Figure 3:
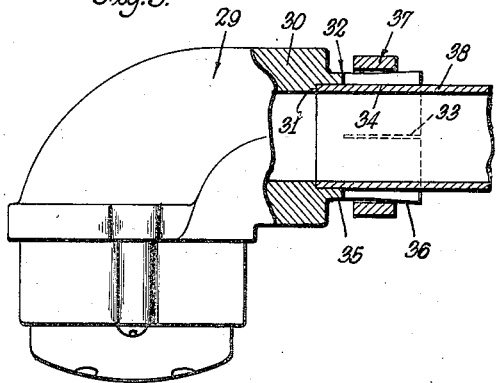
Fig. 3 is a modification in which the sleeve is formed integral with the outlet fitting.

In the construction of Fig. 3 the fitting 29 is provided with what may be termed a sleeve section 30 at one of the openings, this section being rigid and provided with a shoulder 31. The compressible section 32 of the sleeve is provided with a plurality of longitudinal slits 33. This is preferably cylindrical on the inside surface 34 and the major portion of the outside surface 35 is cylindrical except for a cone-shaped cam surface 36 adjacent the outer end which forms the wedge. The wedge construction of Figs. 2 and 3 may be substantially similar.

A collar 37 is employed in the construction of Fig. 3 which is similar to the collar 22 of Fig. 2. Such collar is preferably cylindrical on its inside surface.

The collar of Fig. 3 is slipped over the end of the split section of the sleeve prior to the insertion of the conduit 38, the slots 33 being narrowed sufficiently to pass the collar over the enlarged outwardly tapered end of the sleeve. The sleeve on account of its resiliency then resumes its normal form and the collar is maintained in place even when loosely fitting on the portion of the sleeve on which it has a sliding fit. The conduit is inserted until its end contacts with the shoulder 31. The collar is then pressed outwardly against the wedge portion 36 and thus securely attaches the conduit to the sleeve section of the fitting. In attaching the collar in the constructions of Figs. 2 and 3 it is preferably struck by a hammer or similar tool to drive it firmly onto the wedge or cam end of the split sleeve.

Figure 4:
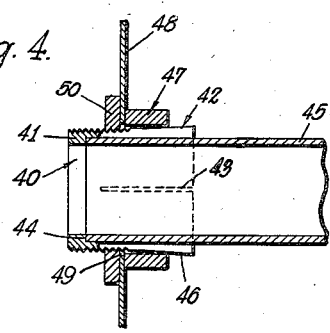

In the construction of Fig. 4 I utilize a sleeve, collar and conduit substantially the same as in Fig. 2, the sleeve as a whole being designated by the assembly numeral 40 in which it has the rigid exteriorly threaded section 41 and the compressible portion 42 with the longitudinal slits 43. The rigid section is provided with a stop shoulder 44 to engage the end of the conduit 45. The outer surface 46 of the compressible section diverges outwardly, forming a wedge adjacent its end. The collar 47 is preferably fitted on the sleeve over the threaded end.

In the manner of assembling shown in Fig. 4 a wall 48 of an outlet box, or the like, is provided with the usual perforation 49 for the insertion of the threaded end of the sleeve 40. A nut 50 is then threaded on the threaded section and tightened against the inside of the wall 48. The collar 47 engages against the outside of this wall and on tightening the nut 50, the collar is wedged on the collar or wedging surface on the exterior of the sleeve.

Thus, if it is desired to attach the conduit to the sleeve and then tighten the sleeve and thus grip the conduit, the procedure may be as above defined in which the tightening of the nut causes a wedging of the collar 47 on the split portion of the sleeve. However, if desired, the conduit may be fitted in the sleeve and the collar tightened to grip the conduit before the assembly on the box and then the nut 50 may be tightened to hold the assembly of the conduit, sleeve and the collar in place.

Figure 6:
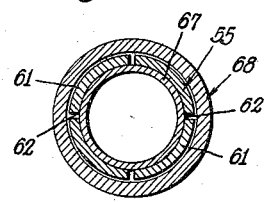
Fig. 6 is a transverse section on the line 6—6 of Fig. 5 in the direction of the arrows.
Figure 5:
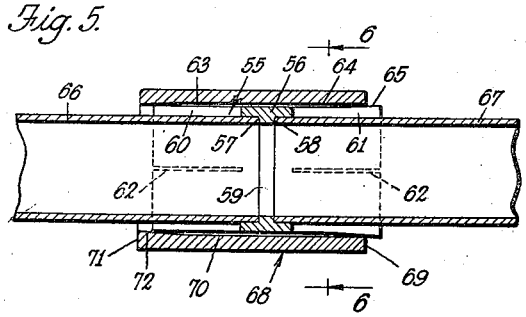
Fig. 5 is a longitudinal section showing a coupling or connection of two conduits.

In the construction of Figs. 5 and 6 the sleeve is designated by the assembly numeral 55. This has a rigid central section 56 with two shoulders 57 and 58 spaced apart by an internal annular rigid section 59. Extending outwardly from one end of the central rigid section there is a compressible section 60 of the sleeve and from the opposite side there is another compressible section 61, both of these sections being provided with longitudinal slits 62. The sections 60 and 61 and the rigid portion of the sleeve adjoining the shoulders are preferably cylindrical and of the same diameter.

The outer surface 63 of the sleeve section 60 is cylindrical throughout its entire length. A portion 64 of the outer surface of the section 61 adjacent the rigid section is also cylindrical but the outer end has an expanded wedging portion 65 gradually increasing in diameter. The conduits 66 and 67 are inserted respectively in the sleeve portions 60 and 61 until they contact the respective shoulders 57 and 58. The sleeve is locked to the conduits by means of the collar 68. This collar is preferably approximately the same length as the complete sleeve and from the leading end 69 has the major portion of its inside surface 70 cylindrical, except that adjacent the rear end 71 there is an inward wedging taper 72. The collar is of sufficient diameter so that the inside cylindrical portion will have a sliding fit on the outside cylindrical surface of the sleeve. The expanding wedge or outward cam 65 on the sleeve is so proportioned to the inward taper 72 on the inside of the collar that the end portion 69 of the collar contacts the wedge surface 65 at the same time the inward taper 72 of the collar contacts the opposite end of the sleeve. Then, when the collar is wedged endwise on the sleeve by being struck on the end 71 by a hammer, or the like, the collar becomes wedged or locked on the sleeve and by the contraction of the split end portions of the sleeve the conduits are firmly attached to the sleeve thus forming a firm and rigid connection between the two conduits.

It will be noted that a characteristic feature of my invention is that the longitudinal splits in the sleeve start in the rigid portion of the sleeve and terminate at the free end of the sleeve. The contractible portions of the sleeve between the splits are as to their outside surface coned outwardly so that the portion of the sleeve adjacent its free end is of larger outside diameter than adjacent the terminal ends of the splits. Hence when the sleeve is attached to a rigid structure the collar must be forced outwardly in order to form a wedging contact with the contractible sections of the sleeve, that is, the collar must be forced away from the rigid portions of the sleeve towards the free ends of the portions between the splits. Therefore if a connection is made to a structure subject to vibration, the collar cannot slide off of the sleeve, but if it should loosen under vibration, it would still be held from slipping off of the sleeve.

Another characteristic feature of my invention is that the internal shoulder of the sleeve is formed in the rigid structure inwardly from the termination of the splits.

Various changes may be made in the details of construction without departing from the spirit or scope of the invention as defined by the appended claims.

I claim:

1. In a coupling, a sleeve having a rigid section with an internal shoulder, a portion of the sleeve extending from the rigid section to a free end and having longitudinal splits such portion being cylindrical on the inside surface, a pipe having a close fit against said surface with its end engaging the shoulder, a collar of greater inside diameter than the rigid portion of the sleeve and insertable thereover, one end portion of the collar and the end portion of the sleeve remote from the rigid structure adjacent its free end having complementary wedging surfaces whereby on longitudinal movement of the collar in reference to the sleeve, the split portion of the sleeve away from the rigid structure toward the free end is contracted to grip the said pipe, the rigid portion of the sleeve having a second internal shoulder and a portion extending therefrom to a second free end having longitudinal splits and a cylindrical inside surface, a second pipe fitted in the said second cylindrical surface of the sleeve and engaging the second shoulder, the second free portion of the sleeves and the collar having complementary wedging surfaces whereby on a longitudinal movement of the collar in reference to the sleeve, both free end portions of the sleeve are contracted to engage both pipes in the sleeve.

2. In a coupling, a sleeve having a central rigid portion with opposite end parts having longitudinal splits extending to the opposite free ends of said portions, two pipes each inserted in the sleeve from the opposite free ends, one of the free end portions of the sleeve having an expanding conical wedging surface, a collar insertable over the opposite end of the sleeve and being of larger inside diameter than the rigid portion of the sleeve, said collar having an inside surface on one end engaging the cone surface of one end of the sleeve, the said collar having an internal cone surface with the smallest part of the cone adjacent the end of the collar opposite the portion of the collar engaging the cone surface of the sleeve whereby on longitudinal movement of the collar in reference to the sleeve both of the free end portions of the sleeve are simultaneously contracted to grip the two pipes.

3. In a coupling as claimed in claim 2, the central rigid portion of the sleeve having two internal shoulders spaced apart by an annular section, the end of each pipe engaging a shoulder and the ends of the pipes being spaced apart by the said annular section.

4. In a coupling, a sleeve having a rigid portion and having a plurality of longitudinal splits terminating at their inner ends at the rigid portion and extending to the free outer end of the sleeve, the sections of the sleeve between the splits being compressible inwardly, the compressible portions of the sleeve on their outside surface being outwardly coned towards their free ends, whereby the outside diameter at the free ends is greater than the diameter adjacent the rigid portion, an internal shoulder in the rigid portion of the sleeve, a pipe fitted in the sleeve from the free end and engaging the shoulder, a rigid collar cylindrical on its inside surface surrounding the sleeve, the collar having a forward end, the collar being movable to move the forward end away from the rigid portion towards the outwardly coned surface of the contracting portions of the sleeve and thereby compress the contracting portions between the splits to clamp the pipe.

5. In a coupling, a sleeve having a rigid end portion with an internal shoulder, a plurality of longitudinal splits extending from the rigid portion and terminating at the end of the sleeve remote from the rigid portion, the outside surface of the sleeve at the split portion being outwardly coned with the small diameter of the cone adjacent the rigid portion and the large diameter remote therefrom, a rigid collar having a portion of its inside surface of slightly larger diameter than the rigid portion of the sleeve, but of less diameter than the large end of the sleeve at the outer terminus of the splits, a pipe fitted in the sleeve from the split end and engaging the said shoulder, the said collar having one end jammed on the coned portion of the sleeve to clamp the sleeve to the pipe, a supporting structure with the rigid portion of the sleeve connected thereto, the collar being entirely out of contact with said supporting structure.

6. In a coupling, the combination of a pipe fitting threaded at one end, a sleeve having a rigid portion with threads, the rigid portion having an internal shoulder, a plurality of longitudinal splits extending from the rigid portion and terminating at the end of the sleeve remote from the rigid portion, the outside surface of the sleeve at the split portion being outwardly coned with the small diameter of the cone adjacent the rigid portion and the large diameter remote therefrom, a pipe fitted in the sleeve from the split end, the inner end of the pipe engaging the said shoulder, a rigid collar having its inside surface of slightly larger diameter than the rigid portion of the sleeve but of less diameter than the large end of the sleeve at the outer terminus of the splits, the said collar having one end jammed on the coned portion of the sleeve to clamp the sleeve to the pipe whereby the assembly of the sleeve, the pipe and the collar may as a unit be attached to the threads of the fitting and when so attached, the collar being entirely out of contact with the fitting.

7. In a coupling, the combination of a supporting structure having an opening, a sleeve having a rigid end portion with an internal shoulder and having longitudinal splits extending from the rigid portion to the remote end of the sleeve, exterior threads on the rigid portion and part of the split portion of the sleeve adjacent such rigid portion, the split part of the sleeve having its outer surface coned with the small diameter of the cone adjacent the ends of the threads and the large diameter of the cone at the remote or terminus end of the splits, a rigid collar having an inside diameter greater than the rigid portion of the sleeve and the portion having the threads thereon but of less diameter than the large end of the sleeve remote from the rigid end, a pipe fitted in the sleeve from the split end, the end of the pipe engaging the said shoulder, the collar being jammed on the coned part of the sleeve to attach the sleeve to the pipe whereby the assembly of the sleeve and the pipe may be inserted through the said opening and a nut threaded on the threads of the sleeve to clamp the structure having the opening between the collar and the nut.

LLOYD GEORGE TERRY.